March 31, 1970  R. C. SHARPLES  3,504,372
ROCKER SWITCH INTERLOCKS WITH HAIRPIN SPRING LATCH MEMBERS
Filed Jan. 18, 1968

INVENTOR
R.C. Sharples
BY Hancock, Downing & Seebold
ATTORNEYS

United States Patent Office 3,504,372
Patented Mar. 31, 1970

3,504,372
ROCKER SWITCH INTERLOCKS WITH HAIRPIN SPRING LATCH MEMBERS
Richard Colin Sharples, Burnley, England, assignor to Joseph Lucas (Industries) Limited, Birmingham, England, a British company
Filed Jan. 18, 1968, Ser. No. 698,792
Claims priority, application Great Britain, Jan. 30, 1967, 4,384/67
Int. Cl. H01h 9/26
U.S. Cl. 200—50                              1 Claim

ABSTRACT OF THE DISCLOSURE

A rocker switch assembly comprises a body supporting first and second rocker switches which are positioned adjacent one another. The body also carries first and second latch members which are associated with the switches respectively, the first latch member being controlled by the first switch to prevent movement of the second switch from its off position to its on position unless the first switch is in its on position, while the second latch member is controlled by the second switch to prevent movement of the first switch from its on position to its off position unless the second switch is in its off position.

---

This invention relates to a rocker switch assembly particularly intended for controlling operation of the side-lamps and head-lamps of a road vehicle.

A rocker switch assembly according to the invention includes a body, first and second rocker switches supported adjacent one another by the body, and first and second latch members carried by the body and associated with the switches, the first latch member being controlled by the first switch to prevent movement of the second switch from its off position to its on position unless the first switch is in its on position while the second latch member is controlled by the second switch to prevent movement of the first switch from its on position to its off position unless the second switch is in its off position.

Figure 1:
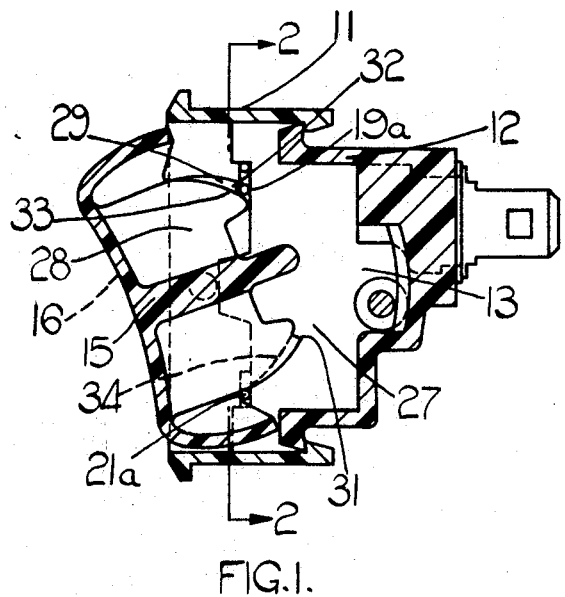
Figure 2:
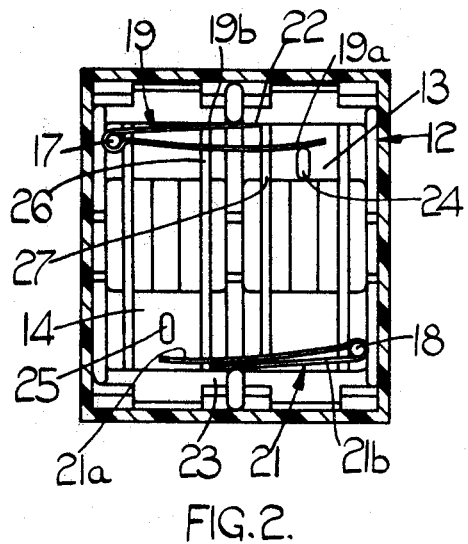

One example of the invention is illustrated in the accompanying drawings wherein, FIGURE 1 is a sectional view of a rocker switch assembly, and FIGURE 2 is a sectional view on the line 2—2 in FIGURE 1 with the operating member of the switches omitted for clarity.

Referring to the drawings there is provided a rectangular escutcheon member 11 which is in use secured to the dash board of a road vehicle. Engaged with the member 11 is moulded synthetic resin body 12 which houses the mechanism of a pair of switches 13, 14, the operating members 15, 16 of the switches being pivotally engaged between the body 12 and the member 11. The switch 13 in use controls the side-lamps of the vehicle while the switch 14 controls the head-lamps of the vehicle.

A pair of posts 17, 18 are moulded integrally with the body 12 at diagonally opposite corners thereof and a pair of hairpin spring latch members 19, 21 are engaged with the posts respectively. The limbs 19a, 19b, 21a, 21b of the members 19, 21 are engaged respectively with walls 22, 23 of the body 12 and with ribs 24, 25 upstanding from the body and the limbs 19a, 21a of the members 19, 21, extend across the open ends of grooves 26, 27 formed in the body 12.

The operating members 15, 16 of the switches 13, 14 are formed with ribs 28, 29 respectively which extend towards the body 12. The ribs 28, 29 are formed at one end with catch portions 31, 32 respectively and at their other end with cam portions 33, 34 respectively, the catch portion 32 of the member 16 being positioned adjacent the cam portion 33 of the member 15 in use while the catch portion 31 of the member 15 is positioned adjacent the cam portion 34 of the member 16. The portions 31, 34, of the members 15, 16 are engageable with the limb 19a of latch member 19 and similarly the portions 32, 33 of the members 15, 16, are engageable with the limb 21a of the latch member 21.

In use, when both switches 13, 14 are in their off positions (as shown in the drawings) the limb 19a of the latch member 19 is engaged at its end with the rib 24 and is engaged between its ends in the catch portion 32 of swtich 14, while the limb 21a of the latch member 21 is urged by the cam portion 34 of the switch 14 towards the limb 21b and clear of the catch portion 31 of the switch 13. Thus the head-lamp switch 14 can not moved to its on position since it is latched in its off position by the limb 19a whereas the side-lamp switch 13 is free to be moved.

Upon moving the switch 13 to its on position to energise the side-lamps, the cam portion 33 thereof moves the limb 19a clear of the catch portion 32 of the switch 14 so freeing the switch 14 for movement to its on position. When the switch 14 is moved to its on position to energise the head-lamps the cam portion 34 of the switch 14 allows the limb 21a of the latch member 21 to move into engagement with the rib 25 on the body and since the switch 13 is in its on position its respective catch portion 31 will be engaged by the limb 21a of the member 21. Thus when both switches are in their on position the switch 13 is latched in the on position by the limb 21a of the member 21 whereas the switch 14 is free to be moved to its off position. Thus, before the switch 13 can be moved to its off position to switch off the side-lamps the switch 14 must be moved to its off position to switch off the head-lamps, whereupon the cam portion 34 of the switch 14 will move the limb 21a of a member 21 clear of the catch portion 31 so that the switch 13 can then be moved to its off position.

Having thus described my invention that I claim as new and desire to secure by Letters Patent is:

1. A rocker switch assembly including a body, first and second rocker switches supported adjacent one another on the body, each rocker switch including a respective operating member, first and second hairpin springs carried by the body and associated with the first and second switches respectively, and a catch member and a cam member formed on each of said operating members, one limb of each of said first and second hairpin springs being fixed, and the other limb of the first hairpin spring being urged by its natural resilience to a position wherein it is engageable with the catch member of the operating member of the second switch, and where it is movable by the cam member of the operating member of the first switch away from said position, the other limb of the second hairpin spring being urged by its natural resilience to a position wherein it is engageable with the catch member of the operating member of the first switch, and is movable by the cam member of the operating member of the second switch away from that position, so that said other limb of the first hairpin spring is controlled by the first switch so as to prevent movement of the second switch from its off position to its on position unless the first switch is in its on position, while said other limb of the second hairpin spring is controlled by the second switch to prevent movement of the first switch from its on position to its off position unless the second switch is in its position.

References Cited

UNITED STATES PATENTS 2,557,351 6/1951 Jacobson.
3,225,153 12/1965 Carling.

FOREIGN PATENTS 1,047,906 12/1958 Germany.
1,114,161 3/1963 Germany.
1,170,498 5/1964 Germany.

ROBERT K. SCHAEFER, Primary Examiner

R. A. VANDERHYE, Assistant Examiner

U.S. Cl. X.R.

200—169